March 13, 1928.  H. FRANK  1,662,805
ELECTRICAL STOVE
Filed July 23, 1926
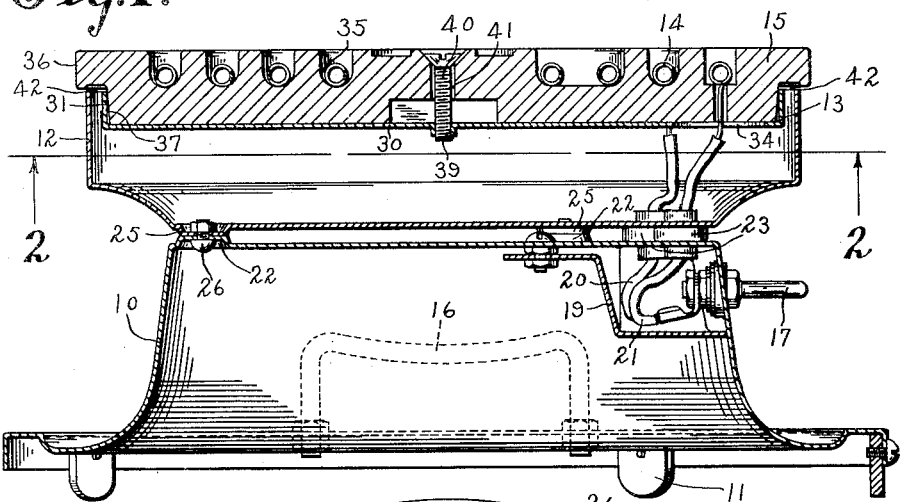
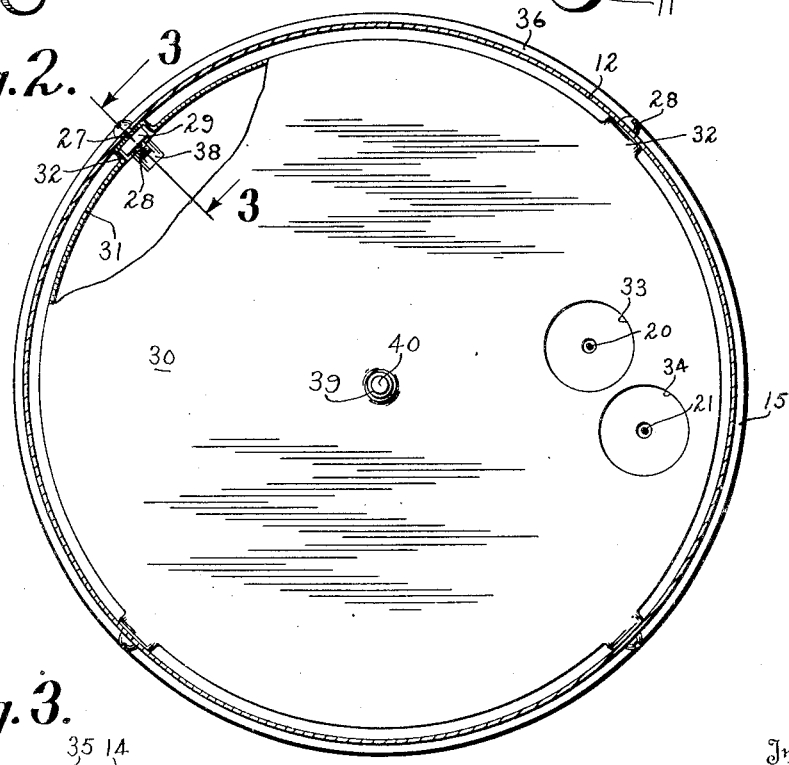
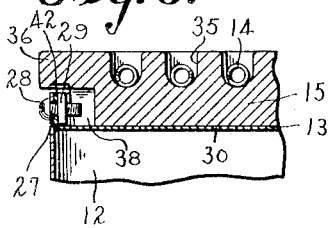
Inventor
Hugo Frank
By Horace L. Rockwell
Attorney Patented Mar. 13, 1928.

1,662,805

UNITED STATES PATENT OFFICE.

HUGO FRANK, OF HARTFORD, CONNECTICUT, ASSIGNOR TO THE FRANK E. WOLCOTT MANUFACTURING CO., A CORPORATION OF CONNECTICUT.

ELECTRICAL STOVE.

Application filed July 23, 1926. Serial No. 124,513.

This invention relates to electrical stoves, and more especially to electrical stoves of the portable type generally used upon or adjacent the table where the food cooked thereby is to be served.

In electrical stoves of this type, the heat producing unit has a generally flat upper surface and comprises a plate or brick of refractory material, having a suitable length of resistance wire embedded or placed within grooves therein. The heat produced by the coil or length of resistance wire by the action of an electric current passing therethrough radiates upwardly and heats the food container seated upon the plate or brick. A certain amount of heat radiates downwardly, and the plate itself becomes heated. It is, therefore, desirable to insulate the metallic portions of the stove as thoroughly as possible from both the plate and the resistance wire, so that the downwardly directed radiated heat will be sufficiently interrupted to prevent the conduction of the same to the base portion of the stove, and therefore, obviate the possibility of mutilating the polished or otherwise highly finished surface of table tops, or the like, upon which the stove is seated.

The principal object of this invention is to provide an electrical stove of the above type, which will have the above advantages and be economical to manufacture and efficient in use.

Another object of this invention is to provide an electrical stove of this type, wherein the downwardly radiated heat will substantially all be interrupted and insulated from the surface upon which the stove is seated.

Still another object of this invention is to provide an electrical stove of this type, the casing of which will be substantially completely insulated from the effects of the heat generated by the heating element thereof.

A still further object of this invention is to provide means for suspending the plate or brick containing the heat producing element from the stove casing or other metallic parts thereof in such a manner that the same will be spaced therefrom, so that there will be a minimum amount of contact therebetween.

Another object of this invention is to provide means to locate and secure the plate in position upon the stove and to retain the same in position thereon by the use of a minimum number of parts.

To these and other ends the invention consists in the novel features and combinations of parts to be hereinafter described and claimed.

In the accompanying drawings:

Fig. 1 illustrates an electrical stove embodying the features of my invention, the view being a longitudinal section through the stove.

Fig. 2 is a section on line 2—2 of Fig. 1, certain parts broken away for the sake of clearness, and Fig. 3 is a section on line 3—3 of Fig. 2.

The electrical stove selected to illustrate the principles and features of my invention, comprises a sheet metal base 10, having feet or legs 11 of insulating material, such as fibre or the like, a sheet metal cup 12, a heating unit support 13, and a heating unit consisting of the heating element 14, which in this instance, is a suitable length of coiled resistance wire embedded or otherwise retained in suitable grooves of the plate 15, made from suitable refractory material.

The base 10 is of inverted cup shape in cross section and is spaced from the surface upon which the stove is seated by the feet or legs 11. Due to the fact that the base is spaced above the surface upon which it rests, and is of the described shape, an air pocket of considerable volume is provided beneath the base wherein there is a circulation of air, which maintains the base in a cool condition. Suitable handles 16 and terminal posts 17 are secured to the base 10. The terminal posts 17 are suitably formed for connection with any well known form of plug so as to connect the same to a source of electrical energy. A sheet metal guard 19 of suitable shape is provided to cover the connections between the leads 20 and 21, and the posts 17. As shown, this guard preferably is disposed wholly within the member 10, with its edges in contact with the inner wall thereof on opposite sides of the plugs, and is provided with a lateral extension at its inner end spaced from the top of the member 10 and conveniently connected thereto. Herein, a screw and plural nut connection 19' is used adjustable from the top or bottom of the member 10 and having its screw head seated in the space between the members 10 and 12 with one of its nuts spacing the extension and the top of the member 10 and the other below the extension so that the latter may be removed downwardly. The base 10 also has a plurality of lugs 22, pressed upwardly from the upper surface thereof to form seats for supporting the cup 12. A plurality of suitable insulating bushings 23 is herein disposed between the base 10 and the cup 12, each herein having reduced ends extending in opposite directions into each of these members, and through these bushings the leads 20 and 21 are threaded, the latter being thereby insulated from the base and cup.

The cup 12 is cup-shaped in cross section and is provided with downwardly pressed lugs 25, which cooperate with the lugs 22 of the base 10 to space these parts from each other. By spacing apart the cup 12 and the base 10, and permitting only a minimum amount of contact therebetween, an insulating air space is provided, and the cooling effect of a circulation of air therebetween tends to prevent the conduction of heat from the cup 12 to the base 10. Suitable means, such as the bolts 26, which pass through the lugs 22 and 25, secure the base 10 and the cup 12 together. A plurality of openings 27 are disposed about the periphery of the cup 12, adjacent its upper edge, which are adapted to receive screws 28. The screws 28 pass through the openings 27 and cooperate with nuts 29 to secure the heating unit support 13 to the cup 12.

The heating unit support is in the form of a shallow vessel, having a flat disk-shaped bottom 30 and a vertically directed flange 31 formed about the periphery thereof. At various points about the flange 31, the metal thereof is pressed outwardly to form laterally directed lugs 32, which engage the inner surface of the cup 12, adjacent its upper edge to laterally space the two parts from each other. The lugs 32 are each provided with an opening corresponding with the opening 27 in the cup 12, and through which the screws 28 may pass. When the nuts 29 are tightened upon the screws 28, the support 13 is securely attached to the cup 12, contacting therewith over a small amount of area and being spaced therefrom by means of the lugs 32, whereby a minimum amount of heat is conducted therebetween. Suitable openings 33 and 34 are provided in the bottom portion 30 to permit the passage of the leads 20 and 21 therethrough. A threaded opening 39 is also provided in the bottom 30 at the center thereof, for a purpose to be hereinafter described.

The heating unit plate 15 is, in this instance, a flat disk having suitable grooves 35 in the upper surface thereof, which are adapted to receive the coiled length of resistance wire or heating element 14, and is provided with a laterally projecting flange 36 on the periphery thereof. The plate 15 is of sufficient diameter across the projecting flange 36 to overlap the flange 31 of the support 13 and the upper edge of the cup 12. An annular shoulder 37 is provided upon the plate 15, below the flange 36, and the plate 15 is of sufficient diameter across the annular shoulder 37 to be received within the flange 31 of the support 13, so that the lower surface of the plate 15 will seat upon the bottom portion 30 of the support 13 and the heating unit will be supported thereby. The flange 31 is of less depth than the height of the shoulder 37, whereby the flange 31 preferably will not engage with the flange 36. The shoulder 37 is provided with depressions 38 into which the ends of the screws 28 are adapted to project, which by cooperation with the material of the plate 15 about the depressions 38, prevent the disk or plate 15 from rotating within the holder 13. A screw 40 passes through a center opening 41 in the plate 15, and threads into the threaded opening 39 in the bottom portion 30 of the holder 13, thereby forming the sole securing means between these parts.

Preferably the upper edge of the flange 31 and the upper edge of the cup 12 are in the same plane so that due to the fact that the plate 15 seats upon the bottom portion 30, and the flange 31 does not engage the flange 36, there will be a space 42 provided between the upper edges of both the cup 12 and the support 13 and the flange 36. This space permits the entrance of air beneath the support 13, which by the circulation thereof has a cooling effect upon the cup 12, the cooling being obtained herein while the appearance is rendered more pleasing and external discoloration prevented by providing as part of this space an annular groove in the bottom surface of the flange 36 surrounding the upper end of the shoulder 37.

By the above structures, the plate 15 is supported in such a manner that the heat produced by the coiled length of resistance wire is to a large degree prevented from being conducted downwardly to heat the base 10 or cup 12, whereby the possibility of heat radiation therefrom is obviated. By suspending the plate 15 in the manner above described, the same is positively retained in position and insulated from the outer metallic parts of the stove by the lateral space between the periphery of the flange 31 of the support 13, and the cup 12, and vertically by the air space below the bottom portion of the support 13, while the space 42 permits a circulation of air therein.

While I have shown and described a preferred embodiment of my invention, it is to be understood that the same is not to be limited to all of the details shown, but is capable of modification and variation which will lie within the spirit of the invention and the scope of the appended claims.

What I claim is:

1. An electrical stove comprising an upright cup-shaped member, a heating unit support, said support having an upwardly projecting flange about the periphery thereof, radially located means securing said support to said upright member in laterally spaced relation thereto, and a heating unit seated within said flange and supported by said support.

2. An electrical stove comprising an upright cup-shaped member, a heating unit support, said support having an upwardly projecting flange about the periphery thereof, radially located means to secure said flange to the periphery of said upright member and dispose said support and member in vertically spaced relation, and a heating unit supported within said flange and engaging said support.

3. An electrical stove comprising an upright cup-shaped member, a heating unit support, said support having an upwardly projecting flange about the periphery thereof, radially located means to secure said flange to the periphery of said upright member, spacing said support laterally and vertically from the latter, and a heating unit supported by said support.

4. An electrical stove comprising an upright cup-shaped member, a heating unit support, said support having a bottom portion and an upwardly projecting flange about the periphery thereof, radially located spaced means to secure said flange to the periphery of said upright member and spacing said support vertically and laterally from the latter, and a heating unit supported within said flange upon said bottom portion, and means to connect said heating unit to the bottom of said support.

5. An electrical stove comprising an upright cup-shaped member, a heating unit support, said support having a flange about the periphery thereof, means extending from said flange to laterally space the same from said upright member, and means to secure said flange to the periphery of said member, and a heating unit supported by said support within said flange.

6. An electrical stove comprising an upright cup-shaped member, a heating unit support, a flange about the periphery of said support, radially located means spacing said support from said upright member, radially located means to secure said support to said member, and a heating unit seated upon said support and supported thereby.

7. An electrical stove comprising an upright cup-shaped member, a heating unit support, said support having a bottom portion, and a flange about the periphery of said bottom portion, means extending laterally from said flange to space said support from said upright member, radially located means to secure said flange to said member in laterally and vertically spaced relation to the latter, a heating unit supported by said support, and means to connect said heating unit to the bottom of said support.

8. An electrical stove comprising an upright cup-shaped member, a heating unit support, said support having a bottom portion and a flange about the periphery thereof, means to secure said flange to the periphery of said upright member holding said support in vertically spaced relation thereto, a heating unit seated upon said bottom portion, said heating unit including a plate, and means terminating short of said upright member passing through said plate and engaging said bottom portion to secure the plate thereto.

9. An electrical stove comprising an upright cup-shaped member, a heating unit support, said support having an annular flange about the periphery thereof, means to secure said flange to the periphery of said upright member holding said support in laterally spaced relation thereto, and a heating unit supported by said support, said heating unit including a plate having a recess in the periphery thereof receiving said securing means to retain said plate against rotation relatively to said flange.

10. An electrical stove comprising an upright cup-shaped member, a heating unit support laterally and vertically spaced from said upright member, radially located spaced supporting means for said support supporting the same in this relation and connecting said support and member, and a heating unit plate supported by said support.

11. In an electrical stove having an upwardly directed cup-shaped member, and a heating unit support receivable in said member and supported thereby, said support having a bottom portion, and an annular flange about the periphery thereof, and portions of said flange projecting laterally outwardly therefrom to engage said member to space the remaining portions of said flange therefrom.

12. In an electrical stove having an upwardly directed cup-shaped member, a heating unit support receivable in said member, said support having a bottom portion, and an annular flange about the periphery thereof, and portions of said flange projecting laterally outwardly therefrom to space the remaining portions of said flange from said member, and means at said lateral projecting portions of said flange to secure said support to said member.

13. In an electrical stove having an upwardly directed cup-shaped member, a heating unit support receivable in said member, said support having an annular flange about the periphery thereof, a heating unit plate upon said supporting member, portions of said flange projecting laterally outwardly therefrom, and means at said laterally projecting portions of said flange to secure said support to said member, said securing means being adapted to engage said heating unit to prevent rotation thereof with respect to said support.

14. In an electrical stove having an upwardly directed cup-shaped member, a heating unit support receivable in said member, said support having a bottom portion spaced from the bottom of said member, and an annular flange about the periphery thereof, a heating unit plate adapted to be received by said support within said flange and to seat upon said bottom portion, single means passing through said plate and into engagement with said bottom portion to secure said plate thereto.

15. In an electrical stove having an upwardly directed cup-shaped member, a heating unit support receivable in said member, said support having a bottom portion spaced from the bottom of said member, and an annular flange about the periphery thereof laterally spaced from said member, a heating unit plate adapted to be received by said support within said flange, and to seat upon said bottom portion, means passing through said plate and into engagement with said bottom portion to secure said plate thereto, and means connecting said flange and said member to support the support thereon.

16. In an electrical stove having an upwardly directed cup-shaped member, a heating unit support receivable in said member, said support having a bottom portion vertically spaced from the bottom of said member, and an annular flange about the periphery thereof laterally spaced from said member, a heating unit plate adapted to be received by said support, means passing through said plate and into engagement with said bottom portion to secure said plate thereto, and means connecting said flange and said member to support the support thereon, said last mentioned means being adapted to engage said plate to prevent rotation thereof with respect to said support.

17. In an electrical stove having an upwardly directed cup-shaped member, a heating unit support receivable in said member, said support having a bottom portion, and an annular flange about the periphery thereof, portions of said flange projecting laterally outwardly therefrom to engage said member to space the remaining portions of said flange therefrom, a heating unit plate adapted to be received in said support and supported thereby, means passing substantially through the center of said plate and into engagement with said bottom portion to secure said plate thereto, and means at said laterally projecting portions of said flange to secure said support to said member, said last mentioned means being adapted to engage said plate to prevent rotation thereof with respect to said support.

18. In an electrical stove having a heating unit plate, means to suspend said plate within an upwardly directed mouth of a cup-shaped member forming a part of said stove, said means including a supporting member having a vertically disposed flange about the periphery thereof, said flange having spaced portions thereon projecting laterally therefrom and adapted to engage said cup-shaped member to space the flange therefrom.

19. In an electrical stove having a heating unit plate, means to suspend said plate within an upwardly directed mouth of a cup-shaped member forming a part of said stove, said means comprising a supporting member having a vertically disposed flange about the periphery thereof, said flange having spaced portions thereon projecting laterally therefrom and adapted to engage said cup-shaped member to space the flange therefrom, and means engageable with said flange portions and said member to secure them together, said portions and means providing air circulating means.

20. In an electrical stove having a heating unit plate, means to suspend said plate within an upwardly directed mouth of a cup-shaped member forming a part of said stove, said means comprising a supporting member having a bottom with a vertically disposed flange about the periphery thereof, said flange having spaced portions thereon projecting laterally therefrom and adapted to engage said cup-shaped member to space the flange therefrom, and means engageable with said flange portions and said member to secure them together, said last mentioned means being adapted to engage said plate to prevent rotation thereof with respect to said support.

21. In an electrical stove having a heating unit plate having an opening in the center thereof, means to suspend said plate within an upwardly directed mouth of a cup-shaped member forming a part of said stove, said means comprising a supporting member having a vertically disposed flange about the periphery thereof, said flange having spaced portions thereon projecting laterally therefrom and adapted to engage said cup-shaped member to space the flange therefrom, and means engaging said flange portions and said member to secure them together, said last mentioned means being adapted to engage said plate to prevent rotation thereof with respect to said support, and means passing through said opening and into the bottom of said supporting member to secure the plate thereto.

22. In an electrical stove having an upwardly directed cup-shaped member, a heating unit support receivable in said member, said support having a means projecting therefrom about the periphery thereof, said means being laterally spaced from said member and having lateral supporting means bridging said space at intervals.

23. In an electrical stove having an upwardly directed cup-shaped member, a heating unit support receivable in said member, said support having a bottom portion and an annular flange about the periphery thereof, said flange being laterally spaced from said member and having its upper edge lying in the same plane as the upper edge of said cup-shaped member.

24. In an electrical stove having an upwardly directed cup-shaped member, a heating unit support receivable in said member, said support having a bottom portion and an annular flange about the periphery thereof, a heating unit on said bottom and within said flange, said flange being laterally spaced from said member and having its upper edge lying in the same plane as the upper edge of said cup-shaped member, the upper edge of said member being vertically spaced from said heating unit.

25. In an electrical stove, an upwardly directed cup-shaped member having a flange surrounding its upper end, a heating unit support having a bottom portion spaced from the bottom of said cup-shaped member by an air chamber and an upwardly directed flange within said first mentioned flange, and means supporting said support disposed between said flanges and providing air passage means extending upward from said chamber.

26. In an electrical stove, an upwardly directed cup-shaped member having a flange surrounding its upper end, a heating unit support having a bottom portion spaced from the bottom of said cup-shaped member by an air chamber and an upwardly directed flange within said first mentioned flange, means supporting said support disposed between said flanges and providing air passage means extending upward from said chamber, and a heating unit supported on said support and having a flange so disposed as to overlie said flanges while permitting air flow therebetween.

27. In combination, a heating plate provided with a flanged top and a reduced annular shoulder on its bottom and a groove of greater diameter than said shoulder and formed in the under side of said flange surrounding the upper end of said shoulder, and supporting devices therefor presenting an air circulating passage means including an external flange spaced from said shoulder and having its upper end terminating short of said flange near said groove to form a concealed air passage over said upper end.

28. A heating plate provided with a flanged top and a reduced annular shoulder on its bottom and a groove of greater diameter than said shoulder and formed in the under side of said flange surrounding the upper end of said shoulder, said plate also having radially located apertures in said shoulder below said groove.

29. In an electrical heating device, an inverted cup-shaped member, an upwardly directed cup-shaped member seated thereon, said elements being provided with spaced abutting punched out projections on their adjacent surfaces forming spacing means therebetween, and means extending through said projections connecting said members.

30. In an electrical stove, a base member, terminal plugs thereon, a heater carrying member seated thereon and spaced apart therefrom and having conductors therein connected to said plugs, and conductor bushing means including a conductor bushing having a flange between its ends disposed between the adjacent surfaces of said members and reduced ends extending in opposite directions therefrom through the different members.

31. In an electrical stove or the like, a base member, terminal means having plugs seated in and extending laterally through one wall thereof and connected conductors within said base, and a closure member within said base member and enclosing the inner end of said plugs and of said conductors and removable bodily through the bottom of said base.

32. In an electrical stove or the like, a base member, terminal means having plugs seated in and extending laterally through one wall thereof and connected conductors leading upward therefrom through the top of said base, and a closure member enclosing the inner end of said plugs and said conductors within said inverted member and removable bodily through the bottom of said base, said closure member having portions abutting the inner walls of said base and an upper lateral extension connected to the inside surface of the top of said base.

33. In an electrical stove, an upright member having an upright flange, a member therein having an upright flange within said first mentioned flange, and radially located laterally extending connecting means between said flanges providing air circulation therebetween and including spaced punched projections on one of said flanges and connecting members clamping the same to the other flange.

34. In an electrical stove, an upright member having an upright flange, a member therein having an upright flange within said first mentioned flange, and radially located laterally extending connecting means between said flanges providing air circulation therebetween and including spaced punched projections on the inner one of said flanges and connecting members clamping the same to the outer flange.

35. In an electrical stove, an upright cup-shaped member having an upright flange, a supporting member therein having an upright flange within said first mentioned flange and its bottom spaced therefrom by an air chamber, radially located laterally extending connecting means between said flanges providing air circulation therebetween and under said support, and a heating unit vertically insertable in said support and having means receiving a part of said connecting means to prevent rotation of said unit.

36. In an electrical stove, an upright cup-shaped member having an upright flange, a supporting member therein having an upright flange within said first mentioned flange and its bottom spaced from the bottom of said upright member by an air chamber, radially located laterally extending connecting means between said flanges providing air circulation therebetween and under said support, a heating unit vertically insertable in said support and having means receiving a part of said connecting means to prevent rotation of said unit and a flange overlying said flanges while permitting circulation therebetween, and an axial screw connection clamping said unit to said support.

In testimony whereof I affix my signature.

HUGO FRANK.